US009376602B2

(12) United States Patent
Walther et al.

(10) Patent No.: US 9,376,602 B2
(45) Date of Patent: Jun. 28, 2016

(54) PROCESS FOR PREPARING A THIXOTROPING AGENT AND USE THEREOF

(75) Inventors: Burkhard Walther, Garching (DE); Helmut Mack, Traunstein (DE); Tobias Austermann, Münster (DE)

(73) Assignee: Construction Research & Technology GmbH, Trostberg (DE)

(*) Notice: Subject to any disclaimer, the term of this patent is extended or adjusted under 35 U.S.C. 154(b) by 510 days.

(21) Appl. No.: 13/704,374

(22) PCT Filed: Jun. 10, 2011

(86) PCT No.: PCT/EP2011/059708
§ 371 (c)(1),
(2), (4) Date: Jun. 28, 2013

(87) PCT Pub. No.: WO2012/000774
PCT Pub. Date: Jan. 5, 2012

(65) Prior Publication Data
US 2013/0303804 A1    Nov. 14, 2013

(30) Foreign Application Priority Data

Jun. 29, 2010   (EP) .................................... 10167656

(51) Int. Cl.
| C08G 18/28 | (2006.01) |
| C08G 18/71 | (2006.01) |
| C08G 18/76 | (2006.01) |
| C09J 11/06 | (2006.01) |
| C09J 175/04 | (2006.01) |

(52) U.S. Cl.
CPC ............. C09J 11/06 (2013.01); C08G 18/2865 (2013.01); C08G 18/715 (2013.01); C08G 18/7671 (2013.01); C09J 175/04 (2013.01); C08G 2190/00 (2013.01)

(58) Field of Classification Search
CPC ............ C08G 18/2865; C08G 18/715; C08G 18/7671; C08G 2190/00; C09J 11/06; C09J 175/04
See application file for complete search history.

(56) References Cited

U.S. PATENT DOCUMENTS

| 3,431,239 A | 3/1969 | Morris et al. |
| 3,547,848 A | 12/1970 | Marsh et al. |
| 3,632,557 A | 1/1972 | Brode et al. |
| 3,886,226 A | 5/1975 | Asai et al. |
| 4,133,483 A * | 1/1979 | Henderson .................... 239/118 |
| 4,857,623 A | 8/1989 | Emmerling et al. |
| 4,882,408 A * | 11/1989 | Blum .............................. 528/49 |
| 5,364,955 A | 11/1994 | Zwiener et al. |
| 5,405,218 A | 4/1995 | Hyde-Smith |
| 5,415,499 A | 5/1995 | Hyde-Smith et al. |
| 5,534,295 A | 7/1996 | Schlichter et al. |
| 5,554,687 A * | 9/1996 | Yang .............................. 525/63 |
| 6,197,912 B1 | 3/2001 | Huang et al. |
| 6,548,593 B2 | 4/2003 | Merz et al. |
| 6,844,413 B2 | 1/2005 | Roesler et al. |
| 6,884,852 B1 | 4/2005 | Klauck et al. |
| 7,417,105 B2 | 8/2008 | Landon et al. |
| 7,439,308 B2 | 10/2008 | Ohno et al. |
| 2002/0007003 A1 | 1/2002 | Merz et al. |
| 2002/0188068 A1 | 12/2002 | Mack et al. |
| 2004/0132950 A1 | 7/2004 | Roesler et al. |
| 2004/0260037 A1 | 12/2004 | Schindler et al. |
| 2005/0107547 A1 | 5/2005 | Ohno et al. |
| 2005/0119421 A1 | 6/2005 | Schindler et al. |
| 2006/0293480 A1 | 12/2006 | Landon et al. |
| 2007/0167598 A1 | 7/2007 | Stanjek et al. |
| 2008/0146695 A1 | 6/2008 | Nefzger et al. |
| 2010/0022739 A1 | 1/2010 | Nefzger et al. |

FOREIGN PATENT DOCUMENTS

| DE | 1 805 693 | 2/1970 |
| DE | 2 307 794 | 8/1973 |
| EP | 0 931 800 A1 | 7/1999 |
| EP | 1 093 482 B1 | 4/2001 |
| EP | 1 152 019 A1 | 11/2001 |
| EP | 1 245 601 A1 | 10/2002 |
| EP | 1 498 433 A1 | 1/2005 |
| EP | 1 685 171 | 8/2006 |
| JP | 2001-172513 A | 6/2001 |
| WO | WO 01/16201 A1 | 8/2001 |
| WO | WO 2004/060953 A1 | 7/2004 |
| WO | WO 2005/042601 A2 | 5/2005 |
| WO | WO 2006/088839 A2 | 8/2006 |
| WO | WO 2008/061651 A1 | 5/2008 |

OTHER PUBLICATIONS

Tomsic, Joan L., (2000). Dictionary of Materials and Testing ($2^{nd}$ Edition). Society of Automotive Engineers, Inc.*
Collins English Dictionary, (2000), London, United Kingdom: Collins.*
PCT/EP2011/059708—International Search Report, Sep. 26, 2011.
PCT/EP2011/059708—International Written Opinion, Sep. 26, 2011.
PCT/EP2011/059708—International Preliminary Report on Patentability, Jun. 29, 2010.
Krzysztof Matyjaszewski and Jianhui Xia, "Atom Transfer Radical Polymerization", Chem. Rev. (2001), vol. 101, No. 9, pp. 2921-2990.
Wade A. Braunecker and Krzysztof Matyjaszewski, "Controlled/Living Radical Polymerization: Features, Developments, and Perspectives", Progress in Polymer Science 32 (2007), pp. 93-146.

* cited by examiner

*Primary Examiner* — Paul A Zucker
*Assistant Examiner* — Mark Luderer
(74) *Attorney, Agent, or Firm* — Curatolo Sidoti Co., LPA; Joseph G. Curatolo; Salvatore A. Sidoti

(57) ABSTRACT

The invention provides a process for preparing a thixotropic agent based on a urea derivative, in which the components α) comprising at least one amine and β) comprising at least one isocyanate, are supplied separately to a mixing means and are mixed with one another, the reaction mixture being discharged by spraying or squirting from the mixing means. Further disclosed is the use of the thixotropic agent in a fluid system. The process is especially suitable for preparing adhesives and sealants.

20 Claims, No Drawings

PROCESS FOR PREPARING A THIXOTROPING AGENT AND USE THEREOF

CROSS REFERENCE TO RELATED APPLICATIONS

The application is a national stage application of International Application No. PCT/EP2011/059708, filed 10 Jun. 2011, which claims priority from European Patent Application No. 10167656.7, filed 29 Jun. 2010, from which application priority is claimed, and which are incorporated herein by reference.

The invention relates to a process for preparing a thixotropic agent and to the introduction of the thixotropic agent into a fluid system. The process is suitable especially for preparing adhesives and sealants.

Thixotropy is the property of certain multi-compound systems to lose viscosity under mechanical stress, such as under stirring, shaking or exposure to ultrasound, for example, and, following the mechanical stress, to return to their original state. Properties of this kind are desired in numerous applications, especially in coating materials such as paints and inks and also in adhesives and sealants.

A large number of compounds are already known for use as thixotropic agents. Inorganic fillers are frequently employed on account of their low price as raw materials, examples being carbon black, Aerosil and very fine or chemically modified pigments. A usual effect of thixotroping with such fillers, however, is an increase in viscosity, and they are therefore contemplated particularly for preparing compositions which are processed mechanically. For manual processing, as when using cartridges, for example, the compositions are preferably made sag-resistant by means of organic thixotropic agents, since such agents produce virtually no increase in viscosity. Examples of known organic thixotropic agents include amide waxes, soaps and hydrolyzed castor oils, with urea derivatives in particular having proved to be particularly advantageous.

The urea derivatives used as thixotropic agents are generally prepared from isocyanates and amines, in a reaction procedure which is highly exothermic. In order to prevent the large amount of heat given off causing decomposition of the resultant product, the starting components are reacted with one another in diluted form, with the solvent serving particularly to remove the heat that is formed. Suitable solvents are, in particular, inert carrier materials, examples being hydrocarbons, oils or plasticizers.

DE 18 05 693 describes the preparation of a thixotropic coating composition which is composed of a relatively large amount of a base coating, comprising varnish or a paint, and a smaller proportion of a quantity of urea, which is produced by an in situ reaction of an aliphatic amine with the isocyanate. This has the disadvantage, however, that the inert carrier materials may migrate after the thixotropic agent has been incorporated into the coating compositions. This may have various consequences, according to the circumstances: for example a loss of adhesion in the case of an adhesive, and, depending on the substances which emerge, a health hazard to humans or an adverse visual effect on absorbent substrates.

With regard to the use of thixotropic agents in adhesives and solvents, therefore, EP 1 152 019 proposes selecting the carrier material of the thixotropic agent such that in the course of crosslinking it is woven into the structural matrix or has a pronounced compatibility with the system as a whole, or is incorporated into the structural matrix and therefore is no longer able to diffuse out of the cured material. However, this has the disadvantage that the carrier material of the thixotropic agent must be tailored precisely to the specific application. In that case it is often necessary to find a carrier material which on the one hand is incorporated fully into the structural matrix of the system in question and on the other hand is sufficiently inert during the preparation of the urea derivative.

It is an object of the present invention, therefore, to provide an operationally flexible and economic process for preparing thixotropic agents on the basis of a urea derivative, the process largely obviating the need for a carrier material for the urea derivative, while also providing a good product quality.

The object is achieved by a process for preparing a thixotropic agent on the basis of a urea derivative, where the components $\alpha$) comprising at least one amine and $\beta$) comprising at least one isocyanate are supplied separately to a mixing means and are mixed with one another, the reaction mixture being discharged by spraying or squirting from the mixing means.

In one preferred embodiment, the mixing means in which the process of the invention is carried out allows a process regime in which component $\alpha$) comprising at least one amine and $\beta$) comprising at least one isocyanate spend only a very short time in the mixing apparatus after mixing has taken place. The time spent by the components following entry into the mixing means is preferably less than 2 seconds, more particularly less than 1 second and very preferably less than 0.5 second.

In one particular embodiment, the mixing means comprises a chamber having at least two openings through which the components $\alpha$) and $\beta$) can be introduced into the chamber. The chamber further possesses an outlet from which the reaction mixture produced is able to leave the mixing means. The mixing means comprises a closure element which is disposed displaceably in the chamber, and which, as a function of its position, wholly or partly blocks off the opening through which the components $\alpha$) and $\beta$) are introduced into the chamber. In one preferred embodiment, the closure means is designed so that it can be moved by an electrical or pneumatic drive. It is considered preferable for both the chamber and the closure element to have a circular cross section. In one particular embodiment, the outlet of the chamber is designed as an atomizing nozzle or else an atomizing nozzle is positioned immediately downstream of the outlet.

Spray heads are particularly suitable as mixing means in the context of the present invention. The spray head may more particularly comprise a two-component spray gun.

Examples of suitable mixing means are high-pressure spraying units from Isotherm AG, especially metering unit PSM 700 in conjunction with the RSP 400 mixing head. In this case the components pass through hollow screws to the purely metallically sealed mixing chamber, where they arrive at up to 200 bar at the nozzle needle. When the mixing head is actuated, the nozzle needle is pulled behind the injectors. The components strike one another at high speed and are intensely mixed. Non-return valves in the hollow screws prevent overflow from one side to the other. At the end, the two component streams are separated by the nozzle needle and the remaining mixture is expelled purely mechanically from the mixing chamber.

It has proven to be particularly advantageous for components $\alpha$) and $\beta$) to be introduced with a pressure of at least 40 to 200 bar into the mixing means. More particularly a pressure of 80 to 120 bar is regarded as being particularly preferred. Through a suitable choice of the pressure of components $\alpha$) and $\beta$) it is also possible here in a simple way to set the mixing ratio relative to one another. In principle, depending on the raw material employed, the components $\alpha$) and $\beta$) of the invention can be mixed with one another within wide ratio ranges. It is recommended, however, for the molar ratio of the amine groups of the amine-comprising component to the isocyanate groups of the isocyanate-comprising component to be 5:1 to 1:5, with a mixing ratio of 1:1 being particularly preferred. In the context of the present invention, component α) comprising at least one amine and component β) comprising at least one isocyanate are intended preferably to contain at least 50% by weight of amine or a mixture of amines, and at least 50% by weight of isocyanate or a mixture of isocyanates. In one embodiment the reaction of α) amine with β) isocyanate is carried out in the absence of solvents.

The chemistry of the preparation of urea derivatives is known (see, for example, DE 18 05 693) and is based preferably on the reaction of an aliphatic amine, such as hexylamine, with an aromatic monomeric diisocyanate such as 4,4'-diphenylmethylene diisocyanate (i.e. MDI), for example.

In accordance with the invention, the amine of component α) may more particularly be N-n-alkylamine and/or N-n-alkenylamine and/or secondary N-alkylamine having 1 to 22 carbon atoms, and/or polyetheramines. Specific examples of amines of component α) here include n-butylamine, 3-methoxypropylamines, polyetheramine D 230, tridecylamine, isobutylamine, tert-butylamine, sec-butylamine, n-octylamine, 2-ethylhexylamine, di(2-ethylhexyl)amine, dibutylamine, dicyclohexylamine, diethylamine, dihexylamine, dimethylethylamine, dipropylamine, ditridecylamine, hexylamine, isopropylamine, monomethylamine, N-ethyl-N-propylamine, propylamine, tridecylamine isomer mixture, n-pentylamine, n-heptylamine, 1-phenylethylamine, 2,6-xylidine, 2-phenylethylamine, anilines, benzylamine, 2-methoxyethylamine, 3-(2-ethylhexoxy)propylamine, 3-ethoxypropylamine, di(2-methoxyethyl)amine, 2-(diethylamino)ethylamine, 2-(diisopropylamino)ethylamine, 3-(dimethylamino)propylamine, 3-(methylamino)propylamine, 1-methoxy-2-propylamine, 2-methoxyethylamine and 2-(dimethylamino)ethylamine. Particularly preferred are n-butylamine and 3-methoxypropylamine.

The isocyanate of component β) may more particularly comprise hexamethylene 1,6-diisocyanate (HDI), Desmodur N 3600® (product of Bayer AG, polyisocyanate comprising isocyanurates of HDI, NCO content: 23.4% by weight, viscosity 1200 mPa/s at 23° C.), 1-isocyanato-3,3,5-trimethyl-5-isocyanatomethylcyclohexane (IPDI), 2,4-and/or 2,6-tolylene diisocyanate (TDI) and/or 4,4'-, 2,4'-and/or 2,2'-diphenylmethane diisocyanate (MDI), m-xylene diisocyanate (MXDI), m-or p-tetramethylxylene diisocyanate (m-TMXDI, p-TMXDI), 4,4'-dicyclohexylmethane diisocyanate (H12MDI), naphthalene 1,5-diisocyanate, cyclohexane 1,4-diisocyanate, hydrogenated xylylene diisocyanate (H6XDI), 1-methyl-2,4-diisocyanatocyclohexane, tetramethoxybutane 1,4-diisocyanate, butane 1,4-diisocyanate, 1,6-diisocyanato-2,2,4-trimethylhexane, 1,6-diisocyanato-2,4,4-trimethylhexane, 1-isocyanato-1-methyl-4(3)-isocyanatomethylcyclohexane (IMCI) and 1,12-dodecane diisocyanate (C12DI) or mixtures thereof. Particular preference is given to 4,4'-, 2,4'-and/or 2,2'-diphenylmethane diisocyanate (MDI) or mixtures thereof.

Aside from the fact that it has been possible to fulfill the stated objectives fully in respect of all the mandates, it has surprisingly emerged that the inventive mixture of α) comprising at least one amine and β) comprising at least one isocyanate, after leaving the mixing means, can be put to very diverse uses.

In one particular embodiment of the invention, the mixture of α) comprising at least one amine and β) comprising at least one isocyanate, after leaving the mixing means, is introduced by spray application, squirt application, squirt introduction or spray introduction (in)to a fluid system. In this case, the fluid system can be prepared continuously or discontinuously.

The present invention hence also provides for the use of the mixture of α) comprising at least one amine and β) comprising at least one isocyanate, where this mixture, after leaving the mixing means, can be introduced by spray application or squirt application into a fluid system. In this case, it is possible freely to select the distance between the exit aperture of the mixing means and the fluid system within wide ranges. Regarded as being particularly preferred is a distance of 1 cm to 5 m and more particularly 5 cm to 3 m. Depending on the chemical properties of the fluid system it may be advantageous to select the distance such that the degree of conversion of α) amine with β) isocyanate prior to contact with the fluid system is as high as possible. This makes it possible to prevent reaction of the as yet unreacted amines or isocyanates, present in the mixture according to the invention, with components of the fluid system. The degree of conversion of α) amine with β) isocyanate on spray application or squirt application, prior to contact with the fluid system, is preferably at least 75%, in particular at least 90% and very preferably at least 99%, relative where appropriate to the component used in deficit proportion.

It has surprisingly been found, however, that with numerous fluid systems it is also possible for the inventively generated mixture of α) comprising at least one amine and β) comprising at least one isocyanate to be introduced, after leaving the mixing means, directly into the fluid system. Despite the generally short reaction time of α) amine with β) isocyanate, the side-reactions with the fluid system can be disregarded and do not substantially influence the properties of the product. With this particular embodiment, the outlet of the mixing means is sited in the fluid system, and the inventive mixture of α) comprising at least one amine and β) comprising at least one isocyanate after leaving the mixing means, is sprayed or squirted directly into the fluid system.

The inventive mixture of α) comprising at least one amine and β) comprising at least one isocyanate can be used, after leaving the mixing means, both in a continuous operation and in a discontinuous operation for the production of a fluid system. Particularly suitable for continuous preparation are extruders, in which the inventive mixture of α) and β) is introduced, after leaving the mixing means, by spray application, squirt application, squirt introduction or spray introduction, continuously, during the production of a fluid system.

It is also possible, however, to use the inventively produced mixture in a discontinuous operation for the production of a fluid system. Suitable mixing means are all of the devices that are known for this purpose to the skilled person, and more particularly may be a static mixer, pressing mixer, planetary mixer, horizontal turbulent mixer (Drais GmbH), planetary dissolver or dissolver and intensive mixer. The inventive mixture of α) and β) is introduced, after leaving the mixing means, by spray application, squirt application, squirt introduction or spray introduction.

It is considered preferable for the thixotropic agent to be introduced into the fluid system in an amount of 0.05 to 40% by weight, based on the total mass of the fluid system, preferably in an amount of 5% to 30% by weight and more particularly 10% to 20% by weight.

In one particular embodiment, the fluid system may comprise at least one curable binder. The curable binders may, more particularly, be epoxides, polyurethanes, acrylates, silylated polyurethanes, silylated acrylates, silylated polyureas, silyl-terminated polyethers and silylated polysulfides. A distinction is made here between one-component (1K) and two-component (2K) systems. 1K systems set by means, for example, of chemical reactions of the binder with the ambient moisture. 2K systems may additionally set by chemical reactions of the mixed components with continuous solidification. The fluid system of the invention is preferably a one-component system. It may, however, also be advantageous to configure the system of the invention in the form of a two-component system. In that case, one component comprises the binder, while the second component comprises, for example, a catalyst or micronized water as booster, which accelerates the curing of the system. There are no restrictions on the component into which the thixotropic agent is incorporated. The present invention in this context envisages that the thixotropic agent is incorporated optionally into only one of the two components of the two-component system, or into both components.

Where the fluid component comprises polyurethanes and/or polyureas, the polyurethanes and polyureas are synthesized from at least one polyol and/or polyamine component and also from a polyisocyanate component, and may optionally comprise chain extenders.

The mode of preparation of the polyurethane or polyurea prepolymers is not critical to the present invention. It may therefore be a one-stage operation, in which the polyols and/or polyamines, polyisocyanates and chain extenders are reacted with one another simultaneously, which may take place, for example, in a batch reaction, or else it may be a two-stage operation, in which, for example, the first product formed is a prepolymer, which is subsequently reacted with chain extenders.

The polyurethanes or polyureas may also comprise further structural units, which more particularly may be allophanates, biuret, uretdione or cyanurates. The aforementioned groups, however, are only examples, and the polyurethanes and polyureas of the invention may also comprise further structural units. The degree of branching as well is not critical to the present invention, and so both linear and highly branched polymers can be used.

In one preferred embodiment of the invention the molar ratio of the isocyanate component present in the polymer to the sum of the polyol and/or polyamine component is 0.01 to 50, preferably 0.5 to 3.0.

The isocyanate component is preferably an aliphatic, cycloaliphatic, araliphatic and/or aromatic compound, preferably a diisocyanate or triisocyanate, and may also comprise mixtures of these compounds. It is regarded here as being preferred for it to be hexa-methylene 1,6-diisocyanate (HDI), HDI uretdione, HDI isocyanurate, HDI biuret, HDI allophanate, 1-isocyanato-3,3,5-trimethyl-5-isocyanatomethylcyclohexane (IPDI), 2,4-and/or 2,6-tolylene diisocyanate (TDI) and/or 4,4'-, 2,4'-and/or 2,2'-diphenylmethane diisocyanate (MDI), polymeric MDI, carbodiimide-modified 4,4'-MDI, m-xylene diiso-cyanate (MXDI), m-or p-tetramethylxylene diisocyanate (m-TMXDI, p-TMXDI), 4,4'-dicyclohexyl-methane diisocyanate (H12MDI), naphthalene-1,5-diisocyanate, cyclo-hexane 1,4-diisocyanate, hydrogenated xylylene diisocyanate (H6XDI), 1-methyl-2,4-diisocyanatocyclohexane, tetramethoxybutane 1,4-diisocyanate, butane 1,4-diisocyanate, 1,6-diisocyanato-2,2,4-trimethylhexane, 1,6-diisocyanato-2,4,4-trimethyl-hexane, 1-isocyanato-1-methyl-4(3)-isocyanatomethylcyclohexane (IMCI) and 1,12-dodecane diisocyanate (C12DI). It may also be 4-dichlorophenyl diisocyanate, dicyclohexylmethane 4,4'-diisocyanate, m-phenylene diisocyanate, p-phenylene diiso-cyanate, 4-chloro-1,3-phenylene diisocyanate, 1,6-hexamethylene diisocyanate, 1,10-decamethylene diisocyanate, lysine alkyl ester diisocyanate, 3,3'-dimethyl-4,4'-diphenylmethane diisocyanate, xylylene diisocyanate, tetramethylxylylene diiso-cyanate, 1,5-tetrahydronaphthalene diisocyanate, tri-isocyanatotoluene, methylene-bis(cyclohexyl) 2,4'-diisocy-anate and 4-methylcyclohexane 1,3-diisocyanate. Suitable more particularly are polyisocyanates having two or three isocyanate groups per molecule. Alternatively this component may comprise mixtures of polyisocyanates, with the average NCO functionality of the isocyanate component in the mixture being able in particular to be 2.1 to 2.3, 2.2 to 2.4, 2.6 to 2.8 or 2.8 to 3.0. Derivatized polyisocyanates may likewise be used, examples being sulfonated isocyanates, blocked isocyanates, isocyanurates and biuret isocyanates.

The polyol and/or polyamine component preferably comprises polyetherester polyol, fatty acid ester polyols, polyether polyols, polyester polyols, polybutadiene polyols and polycarbonate polyols, and may also comprise mixtures of these compounds. The polyols and/or polyamines contain preferably between two and 10, more preferably between two and three hydroxyl groups and/or amino groups, and possess a weight-average molecular weight of between 32 and 30 000, more preferably between 90 and 18 000 g/mol. Suitable polyols are preferably the polyhydroxy compounds that at room temperature are liquids, glasslike solids/amorphous compounds or crystalline compounds. Typical examples might include difunctional polypropylene glycols. It is also possible for preferably hydroxyl-containing random copolymers and/or block copolymers of ethylene oxide and propylene oxide to be used. Suitable polyether polyols are the polyethers known per se in polyurethane chemistry, such as the polyols prepared, using starter molecules, by means of KOH catalysis or DMC catalysis, from styrene oxide, ethylene oxide, propylene oxide, butylene oxide, tetrahydrofuran or epichlorohydrin.

Specific suitability is also possessed more particularly by poly(oxytetramethylene) glycol (polyTHF), 1,2-polybutylene glycol, or mixtures thereof. Particular suitability is possessed by polypropylene oxide, polyethylene oxide and butylene oxide and mixtures thereof. Another type of copolymer which can be used as a polyol component and which terminally contains hydroxyl groups is in accordance with the following general formula (and can be prepared, for example, by means of "controlled" high-speed anionic polymerization according to Macromolecules 2004, 37, 4038-4043):

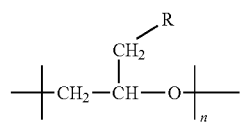

in which R is alike or different and is represented preferably by OMe, OiPr, Cl or Br.

Additionally suitable as a polyol component are, more particularly, the polyester diols and polyester polyols which at 25° C. are liquid, glasslike-amorphous or crystalline compounds and which are preparable by condensation of dicarboxylic or tricarboxylic acids, such as adipic acid, sebacic acid, glutaric acid, azelaic acid, suberic acid, undecanedioic acid, dodecanedioic acid, 3,3-dimethylglutaric acid, terephthalic acid, isophthalic acid, hexahydrophthalic acid and/or dimer fatty acid, with low molecular mass diols, triols or polyols, such as ethylene glycol, propylene glycol, diethylene glycol, triethylene glycol, dipropylene glycol, 1,4-butanediol, 1,6-hexanediol, 1,8-octanediol, 1,10-decanediol, 1,12-dodecanediol, dimer fatty alcohol, glycerol, pentaerythritol and/or trimethylolpropane.

A further suitable group of polyols are the polyesters based, for example, on caprolactone, which are also referred to as "polycaprolactones". Other polyols which can be used are polycarbonate polyols, dimer fatty alcohols and dimerdiols, and also polyols based on vegetable oils and their derivatives, such as castor oil and its derivatives or epoxidized soybean oil. Also suitable are polycarbonates containing hydroxyl groups, which are obtainable by reacting derivatives of carbonic acid, e.g. diphenyl carbonate, dimethyl carbonate or phosgene, with diols. Particular suitability is possessed for example by ethylene glycol, 1,2-and 1,3-propanediol, 1,3- and 1,4-butanediol, 1,6-hexanediol, 1,8-octanediol, neopentyl glycol, 1,4-bishydroxymethyl-cyclohexane, 2-methyl-1,3-propanediol, 2,2,4-trimethylpentane-1,3-diol, dipropylene glycol, polypropylene glycols, dibutylene glycol, polybutylene glycols, bisphenol A, tetrabromobisphenol A, glycerol, trimethylolpropane, 1,2,6-hexanetriol, 1,2,4-butane-triol, trimethylolpropane, pentaerythritol, quinitol, mannitol, sorbitol, methylglycoside and 1,3,4,6-dianhydrohexitols. The hydroxy-functional polybutadienes as well, which are purchasable under trade names including that of "Poly-bd®", can be used as a polyol component, as can their hydrogenated analogs. Additionally suitable are hydroxy-functional polysulfides, which are sold under the trade name "Thiokol® NPS-282", and also hydroxy-functional polysiloxanes.

Particular suitability as a polyamine component which can be used in accordance with the invention is possessed by hydrazine, hydrazine hydrate and substituted hydrazines, such as N-methylhydrazine, N,N'-dimethylhydrazine, acid hydrazides of adipic acid, methyladipic acid, sebacic acid, hydracrylic acid, terephthalic acid, isophthalic acid, semicarbazidoalkylene hydrazides, such as 13-semicarbazidopropionyl hydrazide, semicarbazidoalkylene-carbazine esters, such as, for example, 2-semicarbazidoethyl-carbazine ester and/or aminosemicarbazide compounds, such as 13-aminoethyl semi-carbazidocarbonate. Also suitable for preparing the polyurethanes and polyureas are polyamines based on polyesters, polyolefins, polyacetals, polythioethers, polyethercarbonates, polyethylene terephthalates, polyesteramides, polycaprolactams, poly-carbonates, polycaprolactones and polyacrylates which contain at least two amine groups. Polyamines, such as those sold under the trade name of Jeffamine® (which are polyether polyamines), are also suitable.

As polyol component and/or polyamine component, suitability is also possessed by the species which are known as chain extenders and which, in the preparation of polyurethanes and polyureas, react with excess isocyanate groups; they normally have a molecular weight (Mn) of below 400 and are frequently present in the form of polyols, aminopolyols or aliphatic, cycloaliphatic or araliphatic polyamines.

Examples of suitable chain extenders are as follows:
alkanediols, such as ethanediol, 1,2-and 1,3-propanediol, 1,4-and 2,3-butane-diol, 1,5-pentanediol, 1,3-dimethylpropanediol, 1,6-hexanediol, neopentyl glycol, cyclohexanedimethanol, 2-methyl-1,3-propanediol, hexylene glycol, 2,5-dimethyl-2,5-hexanediol, ethylene glycol, 1,2-or 1,3-propanediol, 1,2-, 1,3-or 1,4-butanediol, 1,2-, 1,3-, 1,4-or 1,5-pentanediol, 1,2-, 1,3-, 1,4-, 1,5-or 1,6-hexanediol, neopentyl hydroxypivalate, neopentyl glycol, dipropylene glycol, diethylene glycol, 1,2-, 1,3-or 1,4-cyclohexanediol, 1,2-, 1,3-or 1,4-cyclohexanedimethanol, trimethylpentanediol, ethylbutyl-propane-diol, diethyloctanediols, 2-butyl-2-ethyl-1,3-propanediol, 2-butyl-2-methyl-1,3-propanediol, 2-phenyl-2-methyl-1,3-propanediol, 2-propyl-2-ethyl-1,3-propanediol, 2-di-tert-butyl-1,3-propanediol, 2-butyl-2-propyl-1,3-propanediol, 1-dihydroxymethylbicyclo[2.2.1]heptane, 2,2-diethyl-1,3-propanediol, 2,2-dipropyl-1,3-propanediol, 2-cyclohexyl-2-methyl-1,3-propanediol, 2,5-dimethyl-2,5-hexanediol, 2,5-diethyl-2,5-hexanediol, 2-ethyl-5-methyl-2,5-hexanediol, 2,4-dimethyl-2,4-pentanediol, 2,3-dimethyl-2,3-butanediol, 1,4-bis(2'-hydroxypropyl)benzene and 1,3-bis(2'-hydroxy-propyl)benzene, and δ-hydroxybutyl-ε-hydroxy-caproic esters, ω-hydroxyhexyl-γ-hydroxy-butyric esters, adipic acid-(β-hydroxyethyl) ester or terephthalic acid bis(β-hydroxyethyl) ester, and aliphatic diamines, aromatic diamines and alicyclic diamines, more particularly methylenediamine, ethylenediamine, 1,2-and 1,3-diaminopropane, 1,4-diaminobutane, cadaverine (1,5-diaminopentane), 1,6-hexamethylenediamine, isophorone-diamine, piperazine, 1,4-cyclohexyldimethylamine, 4,4'-diaminodicyclohexylmethane, aminoethylethanolamine, 2,2,4-trimethylhexamethylenediamine, 2,4,4-trimethylhexamethylenediamine, octamethylenediamine, m-or p-phenylenediamine, 1,3-or 1,4-xylylenediamine, hydrogenated xylylenediamine, bis(4-aminocyclohexyl)methane, 4,4'-methylenebis(ortho-chloroaniline), di(methylthio)toluene-diamine, diethyltoluenediamine, N,N'-dibutylaminodiphenylmethane, bis(4-amino-3-methylcyclohexyl)methane, isomer mixtures of 2,2,4-and 2,4,4-trimethyl-hexa-methylenediamine, 2-methylpentamethylenediamine, diethylenetriamine, and 4,4-diaminodicyclohexylmethane, and also ethanolamine, hydrazineethanol, 2-[(2-aminoethyl)amino]ethanol.

Lastly it should be mentioned that the polyol component and/or polyamine component may contain double bonds, which may result, for example, from long-chain aliphatic carboxylic acids or fatty alcohols. Functionalization with olefinic double bonds is also possible, for example, through the incorporation of vinylic and/or allylic groups, which if desired are alkyl-, aryl-and/or aralkyl-substituted, and also originate from unsaturated acids such as maleic anhydride, acrylic acid or methacrylic acid and their respective esters.

For the purposes of the invention it is preferred for the polyol component and/or polyamine component to be polypropylene diol, polypropylene triol, polypropylene polyol, polyethylene diol, polyethylene triol, polyethylene polyol, polypropylenediamine, polypropylenetriamine, polypropylenepolyamine, polyTHF-diamine, polybutadiene diol, polyester diol, polyester triol, polyester polyol, polyesterether diol, polyesterether triol, polyesterether polyol, more preferably polypropylene diol, polypropylene triol, polyTHF diol, polyhexanediol carbamate diol, polycaprolactam diol and polycaprolactam triol. It is also possible for these components to be mixtures of the stated compounds.

In one particularly preferred embodiment the polyurethanes or polyureas contain polyols having a molecular weight of between 1000 and 10 000, more particularly 2000 to 6000 and very preferably 3000 to 5000 g/mol. These polyols are, with particular preference, polyTHF diol, polypropylene glycol, and also random copolymers and/or block copolymers of ethylene oxide and propylene oxide. More particularly they may be polyether polyols which in one preferred embodiment have been prepared by DMC catalysis and in one particularly preferred embodiment have been prepared by KOH catalysis. In one preferred embodiment use is made as chain extenders of diols having a molecular weight of 60 to 500, more particularly 60 to 180, the dioligomers of glycols being particularly preferred. With regard to the inventive properties of the fluid system it is particularly advantageous, furthermore, if the polyurethanes or polyureas contain 2,4- and/or 2,6-tolylene diisocyanate (TDI) and/or 4,4'-, 2,4'-and/or 2,2'-diphenylmethane diisocyanate (MDI) and/or 1-isocyanato-3,3,5-trimethyl-5-isocyanato-methylcyclohexane (IPDI), more particularly isomer mixtures of TDI, where a 2,4-isomer fraction of more than 40% is particularly preferred.

The polyurethanes or polyureas of the present invention may also comprise crosslinker components, chain stopper components and other reactive components. Some crosslinkers have already been listed among the chain extenders having at least three NCO-reactive hydrogens. The compounds in question may more particularly be glycerol, tetra(2-hydroxypropyl)ethylenediamines, pentaerythritol, trimethylolpropene, sorbitol, sucrose, triethanolamine and polymers having at least three reactive hydrogens (e.g. polyetheramines having at least three amine groups, polymeric triols, etc.). Suitable chain stoppers are, in particular, compounds having reactive hydrogens, such as monools, monoamines, monothiols and monocarboxylic acids. One specific embodiment uses monools, where $C_1$ to $C_{12}$ alcohols (especially methanol to dodecyl alcohol), higher alcohols, polymers such as, for instance, polyethers and polyesters having an OH group and structural units such as glycerol or sucrose, in which all bar one OH group have been reacted, with no further reactive hydrogens having been introduced in the course of the reaction.

In one particularly UV-stable variant, it is preferred as polyol component to use polyesters having at least two OH groups, polycarbonates having at least two OH groups, polycarbonate esters having at least two OH groups, polyTHF, polypropylene glycol, random copolymers and/or block copolymers of ethylene oxide and propylene oxide.

Fluid systems comprising polyurethanes may further comprise stabilizing additives, to protect, for example, from UV radiation, and oxidation; additives of the HALS type are used more particularly. Mention may be made, by way of example, of 4-amino-2,2,6,6-tetramethylpiperidine.

For the polyurethanes and polyureas it is possible as latent curing agents to use oxazolidines, more particularly oxazolidines formed from diethanolamine and isobutylaldehyde or pivalaldehyde and/or aldimines formed from isophoronediamine, e.g. Incozol HP, and aldol ester based aliphatic di-or trialdimines and imines, e.g. Vestamin A139, low molecular mass aliphatic diamines, e.g. hexanediamine, and/or polyether polyamines such as, for example, Jeffamine® and isobutyraldehyde or pivalaldehyde, and/or a polyamine such as hexamethylenediamine, for example, or a Jeffamine® blocked with a hydroxypivalaldehyde ester.

In one preferred embodiment the fluid system of the invention comprises polyurethanes or polyureas which contain free isocyanate groups. The compounds in question here are more particularly isocyanate-terminated prepolymers. The isocyanate groups are able to react with water (including moisture from the atmosphere), forming amine groups which react with the isocyanate groups of the other polyurethane or polyurea molecules, and form urea linkages, thereby curing the fluid system.

In another embodiment, fluid systems comprising polyurea or polyurethane are configured as a two-component system. The first component may comprise a polyisocyanate and/or NCO prepolymer and the second component may comprise a polyol, polyamine and/or chain extender. After the two components have been mixed, these two constituents react with one another, thereby curing the fluid system.

In a further embodiment in accordance with the invention, polyurethane prepolymers and polyurea prepolymers are reacted with at least one suitable functionalized polymerizable compound containing double bond, such as hydroxyethyl methacrylate, hydroxyethyl acrylate, hydroxypropyl methacrylate, hydroxypropyl acrylate, 4-hydroxy-butyl vinyl ether and isoprenol, for example.

Where the fluid systems comprise silylated polyurethanes and silylated polyureas, these polyurethanes and polyureas are constructed from at least one polyol or polyamine component, from at least one polyisocyanate component and from at least one silylating component.

As preferred polyol or polyamine component, and polyisocyanate component, all of the compounds specified for the above-described preparation of the polyurethanes and polyureas are suitable. As far as the silylating component present is concerned, suitability is possessed by 1. primary and/or secondary aminosilanes; α or γ position
   e.g. $H_2N$—$CH_2$—$Si(OR^2)_3$
   $H_2N$—$(CH_2)_3$—$Si(OR^2)_3$
   $R'NH$—$(CH_2)_3$—$Si(OR^2)_3$
   $R'NH$—$CH_2$—$CHMe$-$CH_2$—$Si(OR^2)_3$
   where $OR^2$ independently of one another is represented by an alkoxy group, with $R^2$ being an alkyl group having one to 5 carbon atoms, e.g. methyl, ethyl, isopropyl, n-propyl, n-butyl, isobutyl, sec-butyl, and/or $OR^2$ is a phenoxy group, a naphthyloxy group, a phenoxy group which is substituted in the ortho-, meta-and/or para-position, with a $C_1$-$C_{20}$ alkyl, alkylaryl, alkoxy, phenyl, substituted phenyl, thioalkyl, nitro, halogen, nitrile, carboxyalkyl, carboxyamide, —$NH_2$ and/or NHR group, in which R is a linear, branched or cyclic $C_1$-$C_{20}$ alkyl group, e.g. methyl, ethyl, propyl (m, iso), butyl (m, iso, sec) or cyclohexyl or phenyl, with R' being a linear, branched or cyclic $C_1$-$C_{20}$ alkyl group, e.g. methyl, ethyl, propyl (m, iso), butyl (m, iso, sec) or cyclohexyl or phenyl, 2. isocyanatosilanes; α or γ position
3. products obtained by Michael addition of primary aminosilanes in α-and γ-position and ring closure to form the hydantoin, e.g. U.S. Pat. No. 5,364,955.

With regard to the silylating component present, reference is made to patent applications WO 2006/088839 A2 and WO 2008/061651 A1, and also to patent EP 1 685 171 B1, the content of which is hereby adopted into the present specification.

The silylating components which are present in the silylated polyurethane or in the silylated polyurea and which are preferred for the purposes of the present invention are more particularly silanes of the general formula:

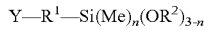

where Y is represented by —NCO, —NHR, —$NH_2$ or —SH,
R is represented by an alkyl group or aryl group having one to 20 carbon atoms, e.g. methyl, ethyl, isopropyl, n-propyl, butyl group (n-, iso-, sec-), cyclohexyl, phenyl and naphthyl,
$R^1$ is represented by a divalent hydrocarbon unit having one to 10 carbon atoms, e.g. ethylene, methylethylene,
Me is represented by methyl,
$OR^2$ independently of one another is represented by an alkoxy group, where $R^2$ is an alkyl group having one to 5 carbon atoms, e.g. methyl, ethyl, isopropyl, n-propyl, n-butyl, isobutyl, sec-butyl, and/or $OR^2$ is a phenoxy group, a naphthyloxy group, a phenoxy group, which is substituted at the ortho-, meta-and/or para-position, with a $C_1$-$C_{20}$ alkyl, alkylaryl, alkoxy, phenyl, substituted phenyl, thioalkyl, nitro, halogen, nitrile, carboxyalkyl, carboxyamide, —$NH_2$ and/or NHR group, in which R is a linear, branched or cyclic $C_1$-$C_{20}$ alkyl group, e.g. methyl, ethyl, propyl (n-, iso-), butyl (n-, iso-, sec-) or phenyl, and n is represented by 0, 1, 2 or 3.

As silylating component it is also possible, however, for mixtures of at least two of the stated compounds to be present in the polymer.

In one preferred embodiment, silylating components of interest are more particularly alkoxysilanes comprising isocyanate groups or amino groups. Suitable alkoxysilanes comprising amino groups are more particularly compounds which are selected from the group consisting of 3-aminopropyltrimethoxysilane, 3-aminopropyltriethoxysilane, 3-aminopropylmethyldimethoxysilane, 3-aminopropylmethyldiethoxysilane, 3-amino-2-methylpropyltrimethoxysilane, 4-aminobutyltrimethoxysilane, 4-aminobutylmethyldimethoxysilane, 4-amino-3-methylbutyltrimethoxysilane, 4-amino-3,3-dimethylbutyl-trimethoxysilane, 4-amino-3,3-dimethylbutyldimethoxymethylsilane, aminomethyltrimethoxysilane, aminomethyldimethoxymethylsilane, aminomethylmethoxydimethyl-silane, aminomethyltriethoxysilane, aminomethyldiethoxymethylsilane, aminomethyl-ethoxydimethylsilane, N-methyl-3-aminopropyltrimethoxysilane, N-methyl-3-amino-propyldimethoxymethylsilane, N-ethyl-3-aminopropyltrimethoxysilane, N-ethyl-3-aminopropyldimethoxymethylsilane, N-butyl-3-aminopropyltrimethoxysilane, N-butyl-3-aminopropyldimethoxymethylsilane, N-cyclohexyl-3-aminopropyltrimethoxysilane, N-cyclohexylaminomethyltriethoxysilane, cyclohexylaminomethyltrimethoxysilane, N-phenyl-3-aminopropyltrimethoxysilane, N-methyl-3-amino-2-methylpropyltrimethoxy-silane, N-methyl-3-amino-2-methylpropyldimethoxymethylsilane, N-ethyl-3-amino-2-methylpropyltrimethoxysilane, N-ethyl-3-amino-2-methylpropyldimethoxymethylsilane, N-ethyl-3-aminopropyldimethoxymethylsilane, N-ethyl-3-aminopropyltrimethoxysilane, N-phenyl-4-aminobutyltrimethoxysilane, N-phenylaminomethyldimethoxymethylsilane, N-phenylaminomethyltrimethoxysilane, N-cyclohexylaminomethyldimethoxymethyl-silane, N-cyclohexylaminomethyltrimethoxysilane, N-methylaminomethyldimethoxymethylsilane, N-methylaminomethyltrimethoxysilane, N-ethylaminomethyldimethoxy-methylsilane, N-ethylaminomethyltrimethoxysilane, N-propylaminomethyldimethoxy-methylsilane, N-propylaminomethyltrimethoxysilane, N-butylaminomethyldimethoxymethylsilane, N-butylaminomethyltrimethoxysilane, N-(2-aminoethyl)-3-aminopropyl-trimethoxysilane, N-(2-aminoethyl)-3-aminopropylmethyldimethoxysilane, 3-[2-(2-aminoethylamino)ethylamino]propyltrimethoxysilane, bis(trimethoxysilylpropyl)amine, bis(dimethoxy(methyl)silylpropyl)amine, bis(trimethoxysilylmethyl)amine, bis(dimethoxy(methyl)silylmethyl)amine, 3-ureidopropyltrimethoxysilane, N-methyl[3-(tri-methoxysilyl)propyl] carbamates, N-trimethoxysilylmethyl-O-methylcarbamate, N-dimethoxy(methyl)silylmethylcarbamate and the analogs thereof having ethoxy or isopropoxy groups or n-propoxy groups or n-butoxy groups or isobutoxy groups or sec-butoxy groups instead of the methoxy groups on the silicon.

Suitable alkoxysilanes comprising isocyanate groups are more particularly compounds which are selected from the group consisting of isocyanatopropyltriethoxysilane, iso-cyanatopropyltrimethoxysilane, isocyanatopropylmethyldiethoxysilane, isocyanato-propylmethyldimethoxysilane, isocyanatomethyltrimethoxysilane, isocyanatomethyltriethoxysilane, isocyanatomethylmethyldiethoxysilane, isocyanatomethylmethyldi-methoxysilane, isocyanatomethyldimethylmethoxysilane or isocyanatomethyldimethylethoxysilane, and also their analogs having isopropoxy or n-propoxy groups.

With regard to the silylated polyurethanes for preferred use in accordance with the present invention, and to their preparation, reference is made, furthermore, to patent applications U.S. Pat. No. 3,632,557, U.S. Pat. No. 5,364,955, WO 01/16201, EP 931800, EP 1093482 B1, US 2004 260037, US 2007167598, US 2005119421, U.S. Pat. No. 4,857,623, EP 1245601, WO 2004/060953, and DE 2307794, the content of which is hereby adopted into the present specification.

The acrylates which can be used in accordance with the invention in the fluid system are compounds which include at least one monomer from the series of the acrylic esters and methacrylic esters, with preferably at least 70% by weight of the polymer being composed of at least one compound from the series of the acrylic esters, methacrylic esters and styrenes.

The monomers of the acrylate component preferably comprise at least one compound from the series ethyldiglycol acrylate, 4-tert-butylcyclohexyl acrylate, dihydrocyclo-pentadienyl acrylate, lauryl (meth)acrylate, phenoxyethyl (meth)acrylate, isobornyl (meth)acrylate, dimethylaminoethyl (meth)acrylate, cyanoacrylates, citraconate, itaconate and derivatives thereof, (meth)acrylic acid, methyl (meth)acrylate, ethyl (meth)acrylate, n-propyl (meth)acrylate, isopropyl (meth)acrylate, n-butyl (meth)-acrylate, isobutyl (meth)acrylate, tert-butyl (meth)acrylate, n-pentyl (meth)acrylate, n-hexyl (meth)acrylate, cyclohexyl (meth)acrylate, n-heptyl (meth)acrylate, n-octyl (meth)acrylate, 2-propylheptyl (meth)acrylate, 2-ethylhexyl (meth)acrylate, nonyl (meth)acrylate, decyl (meth)acrylate, isodecyl (meth)acrylate, dodecyl (meth)acrylate, phenyl (meth)acrylate, tolyl (meth)acrylate, benzyl (meth)acrylate, 2-methoxyethyl (meth)acrylate, 3-methoxybutyl (meth)acrylate, 2-hydroxyethyl (meth)acrylate, 2-hydroxypropyl (meth)acrylate, stearyl (meth)acrylate, glycidyl (meth)acrylate, 2-aminoethyl (meth)acrylates, γ-(methacryloyloxypropyl)trimethoxysilane, ethylene oxide adducts of (meth)acrylic acid, trifluoromethylmethyl (meth)acrylate, 2-trifluoro-methylethyl (meth)acrylate, 2-perfluoroethylethyl (meth)acrylate, 2-perfluoro-ethyl-2-perfluorobutylethyl (meth)acrylate, 2-perfluoroethyl (meth)acrylate, perfluoromethyl (meth)acrylate, diperfluoromethylmethyl (meth)acrylate, 2-perfluoromethyl-2-perfluoro-ethylmethyl (meth)acrylate, 2-perfluorohexylethyl (meth)acrylate, 2-perfluorodecylethyl (meth)acrylate and 2-perfluorohexadecylethyl (meth)acrylate.

In one particular embodiment the monomers in question are two or more monomers from the series n-butyl (meth)acrylate, 2-hydroxyethyl (meth)acrylate, acrylic acid, methacrylic acid and methyl methacrylate.

Another embodiment uses copolymers of at least two of all of the aforementioned monomers, the proportion being selected in the form such that the resultant copolymers have the desired performance properties for the particular end use. The skilled person is aware of suitable copolymers having the desired performance properties. Preference is given more particularly to copolymers of n-butyl acrylate and methyl methacrylate, which are used in a molar ratio at which the resultant copolymer possesses a glass transition temperature which lies between those of the corresponding homopolymers. All in all, the acrylates of the present invention may be either copolymers or homopolymers.

The acrylic acid polymers may also, furthermore, comprise other ethylenically unsaturated monomers, examples being isoprenol or hydroxybutyl vinyl ether. Examples here include mono-and polyunsaturated hydrocarbon monomers, vinyl esters (e.g. vinyl esters of $C_1$ to $C_6$ saturated monocarboxylic acids), vinyl ethers, monoethylenically unsaturated monocarboxylic and polycarboxylic acids and alkyl esters of these monocarboxylic and polycarboxylic acids (e.g. acrylic esters and methacrylic esters such as, for instance, $C_1$ to $C_{12}$ alkyl and more particularly $C_1$ to $C_4$ alkyl esters), amino monomers and nitriles, vinyls and alkylvinylidenes and amides of unsaturated carboxylic acids. Also suitable are unsaturated hydrocarbon monomers comprising styrene compounds (e.g. styrene, carboxylated styrene and alpha-methyl-styrene), ethylene, propylene, butylene and conjugated dienes (butadiene, isoprene and copolymers of butadiene and isoprene). The vinyl and halovinylidene monomers include vinyl chloride, vinylidene chloride, vinyl fluoride and vinylidene fluoride. Examples of the vinyl esters include aliphatic vinyl esters, such as vinyl formate, vinyl acetate, vinyl propionate, vinyl butyrate, vinyl isobutyrate, vinyl valerate, vinyl caproate and allyl esters of saturated monocarboxylic acids such as allyl acetate, allyl propionate and allyl lactate. The vinyl ethers include methyl vinyl ether, ethyl vinyl ether and n-butyl vinyl ether. Typical vinyl ketones include methyl vinyl ketones, ethyl vinyl ketones and isobutyl vinyl ketones. Examples of the dialkyl esters of monoethylenically unsaturated dicarboxylic acids are dimethyl maleate, diethyl maleate, dibutyl maleate, dioctyl maleate, diisooctyl maleate, dinonyl maleate, diisodecyl maleate, ditridecyl maleate, dimethyl fumarate, diethyl fumarate, dipropyl fumarate, dibutyl fumarate, dioctyl fumarate, diisooctyl fumarate, didecyl fumarate, dimethyl itaconate, diethyl itaconate, dibutyl itaconate and dioctyl itaconate. In particular the monoethylenically unsaturated monocarboxylic acids are acrylic acid, methacrylic acid, ethacrylic acid and crotonic acid. The monoethylenically unsaturated dicarboxylic acids include maleic acid, fumaric acid, itaconic acid and citric acid. As monoethylenically unsaturated tricarboxylic acids it is possible, with a view to the present invention, to make use, for example, of aconitic acid and its halogen-substituted derivatives. It is possible, furthermore, to use the anhydrides and esters of the aforementioned acids (e.g. maleic anhydride and citric anhydride). Examples of nitriles of ethylenically unsaturated monocarboxylic, dicarboxylic and tricarboxylic acids include acrylonitrile, α-chloro-acrylonitrile and methacrylonitrile. The amides of the carboxylic acids may be acrylamides, methacrylamides and other α-substituted acrylamides and N-substituted amides, e.g. N-methylolacrylamide, N-methylolmethylacrylamide, alkylated N-methylol-acrylamides and N-methylolmethacrylamides (e.g. N-methoxymethylacrylamide and N-methoxymethylmethacrylamide). Amino monomers used may be substituted and unsubstituted aminoalkyl acrylates, hydrochloride salts of the amino monomers, and methacrylates such as, for instance, β-aminoethyl acrylate, β-aminoethyl methacrylate, dimethylaminomethyl acrylate, β-methylaminoethyl acrylate and dimethylaminomethyl methacrylate. In the context of the present invention, with regard to the cationic monomers, mention may be made of α-and β-ethylenically unsaturated compounds which are suitable for polymerization and contain primary, secondary or tertiary amino groups, examples being dimethylaminoethyl methacrylate, dimethylaminoneopentyl acrylate, dimethylaminopropyl methacrylate and tert-butylaminoethyl methacrylate, or organic and inorganic salts of these compounds, and/or alkylammonium compounds such as, for instance, trimethylammonioethyl methacrylate chloride, diallyldimethyl-ammonium chloride, β-acetamidodiethylaminoethyl acrylate chloride and meth-acrylamidopropyltrimethylammonium chloride. These cationic monomers may be used alone or in combination with the aforementioned further monomers. Examples of hydroxy-containing monomers also include the β-hydroxyethyl (meth)acrylates, β-hydroxypropyl (meth)acrylates, γ-hydroxypropyl (meth)acrylates and so on.

The silyl-terminated acrylates which can be used in accordance with the invention in the fluid system are constructed from at least one acrylate component and at least one silyl component. The silyl-terminated acrylates may be obtained, for example, from the reaction of alkenyl-terminated acrylates by hydrosilylation, the alkenyl-terminated acrylates being preparable by atom transfer radical polymerization (ATRP) or being preparable from the reaction of alkyl-terminated acrylates with a monomer comprising silyl groups, the alkenyl-terminated acrylates being preparable via atom transfer radical polymerization (ATRP).

Suitable monomers for the synthesis of the acrylate component are all of the compounds stated for the above-described preparation of the polyacrylates.

Where the silyl component is attached by hydrosilylation to the acrylate component, suitable silyl components include more particularly dimethylchlorosilane, dimethyl-dichlorosilane, methyltrichlorosilane, hexamethyldisilazane, trichlorosilane, methyl-dichlorosilane, dimethylchlorosilane, phenyldichlorosilane and also trimethoxysilane, triethoxysilane, methyldiethoxysilane, methyldimethoxysilane and phenyldimethoxy-silane, and also methyldiacetoxysilane, phenyldiacetoxysilane, bis(dimethylketoxi-mato)methylsilane and bis(cyclohexylketoximato)methylsilane. Preferred in this case more particularly are the halosilanes and alkoxysilanes.

Where the silyl component is attached to the acrylate component by a monomer comprising silyl groups, suitable silyl components include more particularly 3-(meth)-acryloyloxypropyltrimethoxysilane, 3-(meth)acryloyloxypropylmethyldimethoxysilane, 3-(meth)acryloyloxypropyltriethoxysilane, 3-(meth)acryloyloxypropylmethyldiethoxy-silane, (meth)acryloyloxymethyltrimethoxysilane, (meth)acryloyloxymethylmethyldi-methoxysilane, (meth)acryloyloxymethyltriethoxysilane, (meth)acryloyloxymethyl-methyldiethoxysilane.

The silyl-terminated acrylates of the invention possess a weight-average molecular weight of between 500 and 200 000 g/mol, more preferably between 5000 and 100 000 g/mol.

With regard to the silyl-terminated acrylates for preferred use in accordance with the present invention, reference is made to patent application EP 1498433 and to Chem. Rev. (2001), 101, 2921-2990, Atom Transfer Radical Polymerization, Krzysztof Matyjaszewski and Jianhui Xia, and to Progress in Polymer Science 32 (2007), 93-146, Controlled/living radical polymerization: Features, developments, and perspectives, Wade A. Braunecker, Krzysztof Matyjaszewski, Elsevier, the content of which is hereby adopted into the present specification.

The polysulfides which can be used in accordance with the invention in the fluid system are organic polymers which have sulfide bonds in the polymer. These may be, by way of example, a product of the reaction of an organic dihalide with sodium disulfide. Examples of the organic dihalides include aliphatic dihalides (e.g. bis-chloroethyl-formal) and vinyl halides. Thus, for example, the reaction of bis-chloroethyl-formal with a sodium disulfide solution leads to a polymer of the following structure:

in which "n" denotes the number of monomers in the polymer and "x" the number of successive sulfide bonds in the monomer (x may vary in the monomers of the same molecule). High molecular mass polymers of this kind may then be reacted to shorter-chain polymers with terminal thiol groups (for example by reductive reaction with NaSH and $Na_2SO_2$, and subsequent acidification). In this way, liquid, bridged polysulfides are obtained with terminal thiol end groups, which in specific embodiments have a molecular weight in the range from 1000 to 8000. The liquid polymers may then be cured to form elastomeric solids, as for example by the oxidation of the thiol end groups to disulfide bridges, using an oxidizing reagent such as, for instance, lead oxide, manganese dioxide, para-quinone dioxime and zinc peroxide. For the purposes of the present invention, the polysulfide fluid systems encompass all polysulfide polymers which can be converted to a solid by curing. In specific embodiments the polysulfide fluid systems comprise 30 to 90% by weight of at least one liquid polysulfide polymer, 2 to 50% by weight of a filler, 2 to 10% by weight of a cyclohexanepolycarboxylic acid derivative, 1 to 3% by weight of a water scavenger and between 6 and 15% by weight of further ingredients such as, for instance, adhesion promoters, solvents and curing agents. An example of the preparation of polysulfide fluid systems is disclosed in U.S. Pat. No. 3,431,239 (column 3, line 20 to column 8, line 45), with this method being incorporated into the present specification by reference. Polysulfide-based fluid systems can be used as one-or two-component systems.

The silylated polysulfides which can be used preferably in accordance with the invention are constructed from at least one polysulfide component and at least one silylating component, and are represented preferably by the following simplified formula:

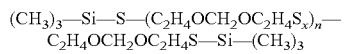

These preferred silylated polysulfides are prepared by the following process:

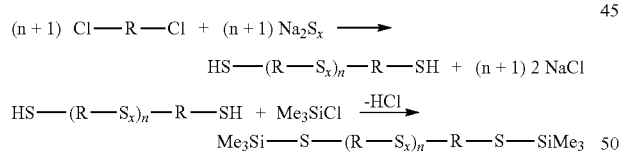

where R is represented by an alkyl group or an ether group.

With regard to the silylated polysulfides whose use is preferred in accordance with the present invention, reference is made to the publication "ALPIS Aliphatische Polysulfide", Hüthing & Wepf, Basle, 1992, Heinz Lucke, ISBN 3-85739-1243, the content of which is hereby adopted into the present specification.

The silylated polyethers which can be used in accordance with the invention in the fluid system are constructed from at least one polyether component and at least one silylating component. For some time, fluid systems, in particular construction sealants, have been on the market that comprise so-called MS-Polymer® from Kaneka and/or Excestar from Asahi Glass Chemical, where "MS" stands for "modified silicone". These silyl-terminated polyethers are particularly suitable for the present invention. They are polymers which are composed of polyether chains with silane end groups, prepared by the hydrosilylation of terminal double bonds. The silane end groups are composed of a silicon which is attached to the polyether chain and to which two alkoxy groups and one alkyl group, or three alkoxy groups, are attached. As a result of the reaction with moisture, the alkoxy groups undergo hydrolysis to form alcohols, and the resultant Si—OH groups subsequently condense to form an Si—O—Si network.

Suitable polyether components for the silyl-terminated polyethers include, among others, the polyols that are prepared, using starter molecules, from styrene oxide, propylene oxide, butylene oxide, tetrahydrofuran or epichlorohydrin. Especially suitable are polypropylene oxide, polybutylene oxide, polyethylene oxide and tetrahydrofuran or mixtures thereof. In this case, preference is given in particular to molecular weights between 500 and 100 000 g/mol, especially 3000 and 20 000 g/mol.

For the purpose of introducing the double bonds, the polyether is reacted with organic compounds comprising a halogen atom selected from the group consisting of chlorine, bromine and iodine, and with a terminal double bond. Particularly suitable for this purpose are allyl chlorides, allyl bromides, vinyl(chloromethyl)benzene, allyl(chloro-methyl)benzene, allyl(bromomethyl)benzene, allyl chloromethyl ether, allyl(chloro-methoxy)benzene, butenyl chloromethyl ether, 1,6-vinyl(chloromethoxy)benzene, with the use of allyl chloride being particularly preferred.

The resulting polyethers with terminal double bonds are reacted by hydrosilylation to form the silyl-terminated polyethers. Particularly suitable hydrosilylating agents for this reaction include trichlorosilane, methyldichlorosilane, dimethylchlorosilane, phenyldi-chlorosilane and also trimethoxysilane, triethoxysilane, methyldiethoxysilane, methyldimethoxysilane and phenyldimethoxysilane, and also methyldiacetoxysilane, phenyldiacetoxysilane, bis(dimethylketoximato)methylsilane and bis(cyclohexylketoximato)methylsilane. Particularly preferred in this context are the halosilanes and alkoxysilanes.

The fluid system may further comprise at least one component from the series of fillers, plasticizers, adhesion promoters, catalysts, UV stabilizers, dryers and rheology modifiers. Specifically, these may be, among others, the following components:

Adhesion promoters, examples being epoxysilanes, anhydridosilanes, adducts of silanes with primary aminosilanes, ureidosilanes, aminosilanes, diaminosilanes, and also their analogs in the form of monomer or oligomer and urea-silanes; e.g. Dynasylan AMEO, Dynasylan AMMO, Dynasylan DAMO-T, Dynasylan 1146, Dynasylan 1189, Silquest A-Link 15, epoxy resins, alkyl titanates, titanium chelates, aromatic polyisocyanates, phenolic resins; which conform, for example, to the general formula:

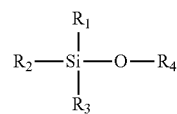

in which $R_1$, $R_2$ and $R_3$ independently of one another are halogen, amine, hydrogen, alkoxy, acyloxy, alkyl, aryl, aralkyloxy, alkylaryl or aralkyl groups and also alkyl group with olefinic groups, halides, amino, carbonyl, epoxy and glycidyloxy, ester, hydroxyimino, mercapto and sulfido, isocyanato, anhydrido, acryloyloxy, methacryloyloxy and vinyl groups, and also aryl group with olefinic groups, halides, amino, carbonyl, epoxy and glycidyloxy, ester, hydroxyimino, mercapto and sulfido, isocyanato, anhydrido, acryloyloxy, methacryloyloxy and vinyl groups, and also alkylaryl group with olefinic groups, halides, amino, carbonyl, epoxy and glycidyloxy, ester, hydroxyimino, mercapto and sulfido, isocyanato, anhydrido, acryloyloxy, methacryloyloxy and vinyl groups, and also aralkyl group with olefinic groups, halides, amino, carbonyl, epoxy and glycidyloxy, ester, hydroxyimino, mercapto and sulfido, isocyanato, anhydrido, acryloyloxy, methacryloyloxy, and vinyl groups, and $R_4$ is alkyl and aryl.

dryers, e.g. vinyltriethoxysilane, vinyltrimethoxysilane, α-functional silanes such as N-(silylmethyl)-O-methyl-carbamates, more particularly N-(methyldimethoxysilylmethyl)-O-methyl-carbamate, (methacryloyloxymethyl)silanes, methoxymethylsilanes, N-phenyl-, N-cyclohexyl- and N-alkylsilanes, orthoformic esters, calcium oxide or molecular sieve;

catalysts, examples being metal catalysts in the form of organotin compounds such as dibutyltin dilaurate and dibutyltin diacetylacetonate, organobismuth compounds or bismuth complexes; compounds containing amino groups, examples being 1,4-diazabicyclo[2.2.2]octane and 2,2'-dimorpholinodiethyl ether, 1,8-diazabicyclo[5.4.0]undec-7-enes, 1,5-diazabicyclo[4.3.0]non-5-enes, N,N'-dimethylpiperazines, and also aminosilanes. Further suitable metal catalysts include titanium, zirconium, bismuth, zinc and lithium catalysts, and also metal carboxylates, it also being possible to use combinations of different metal catalysts;

light stabilizers and ageing inhibitors, which act in particular as stabilizers against heat, light and UV radiation, examples being phenolic antioxidants which function as free-radical scavengers, such as 2,6-di-tert-butyl-p-cresol, 2,6-di-tert-butylphenol, 2,4-dimethyl-6-tert-butylphenol, 2,2'-methylenebis(4-methyl-6-tert-butylphenol), 4,4'-butylidenebis(3-methyl-6-tert-butylphenol), 4,4'-thiobis(3-methyl-6-tert-butylphenol), 5-tetrakis[methylene-3-(3,5-di-tert-butyl-4-hydroxyphenyl)propionate]methanes and 1,1,3-tris(2-methyl-4-hydroxy-5-tert-butylphenyl)butanes, and antioxidants based on amines (for example phenyl-β-naphthylamine, α-naphthylamine, N,N'-di-sec-butyl-p-phenylenediamine, phenothiazine and N,N'-diphenyl-p-phenylenediamines);

flame retardants, e.g. $Al(OH)_3$, huntite, brominated alkyl and aryl compounds, magnesium hydroxide, ammonium polyphosphate;

biocides, such as, for example, algicides, fungicides or fungal growth inhibitor substances, e.g. Ag, $Ag^+$, compounds which give off $CH_2O$;

fillers, e.g. ground or precipitated calcium carbonates, which if appropriate are coated with fatty acids or fatty acid mixtures, e.g. stearates, more particularly finely divided, coated calcium carbonate, carbon blacks, especially industrially manufactured carbon blacks, kaolins, aluminum oxides, silicas, more particularly highly disperse silica from pyrolysis processes, PVC powders or hollow beads. Preferred fillers are carbon black, calcium carbonates, such as precipitated or natural chalks such as Omya 5 GU, Omyalite 95 T, Omyacarb 90 T, Omyacarb 2 T-AV® from Omya, Ultra P-Flex® from Specialty Minerals Inc, Socal® U1S2, Socai® 312, Winnofil® 312 from Solvay, Hakuenka® from Shiraishi, highly disperse silicas from pyrolysis processes, and combinations of these fillers. Likewise suitable are minerals such as siliceous earth, talc, calcium sulfate (gypsum) in the form of anhydrite, hemihydrate or dihydrate, finely ground quartz, silica gel, precipitated or natural barium sulfate, titanium dioxide, zeolites, leucite, potash feldspar, biotide, the group of soro-, cyclo-, ino-, phyllo-and hectosilicates, the group of low-solubility sulfates such as gypsum, anhydrite or heavy spar ($BaSO_4$), and also calcium minerals such as calcite, metals in powder form (aluminum, zinc or iron, for example), and barium sulfate;

rheology modifiers, such as thickeners, e.g. urea compounds and also mono-amines, e.g. n-butylamine, methoxybutylamine and polyamide waxes, bentonites, silicones, polysiloxanes, hydrogenated castor oil, metal soaps, such as calcium stearate, aluminum stearate, barium stearate, precipitated silica, fumed silica and also poly(oxy-1,2-ethanediyl)-α-hydro-Ω-hydroxy polymer with oxy-1,2-ethanediyl-α-hydro-Ω-hydroxy-nonylphenoxyglycidyl ether oligomers and 5-isocyanato-1-(iso-cyanatomethyl)-1,3,3-trimethylcyclohexane or hydroxyethylcellulose or polyacrylic acid polymers and copolymers;

surface-active substances such as, for example, wetting agents, leveling agents, deaerating agents, defoamers and dispersants;

fibers, as for example of carbon, polyethylene or polypropylene, $SiO_2$, cellulose;

pigments, e.g. titanium dioxide;

solvents such as, for instance, water, solvent naphtha, methyl esters, aromatic hydrocarbons such as polyalkylbenzenes, toluene and xylene, solvents based on esters such as ethyl acetate, butyl acetate, allyl acetate and cellulose acetate, and solvents based on ketones such as methyl ethyl ketone, methyl isobutyl ketone and diisobutyl ketone, and also acetone, and mixtures of at least two of the aforementioned solvents;

plasticizers, examples being di-2-ethylhexyl terephthalate, diisononyl cyclohexane-1,2-dicarboxylate, glycerol triacetate (triacetin), 2,2,4-trimethyl-1,3-pentanediol diisobutyrates, phthalic esters such as, for instance dioctyl phthalate, di-2-ethylhexyl phthalate (DEHP), diisooctyl phthalate (DIOP), diisononyl phthalate (DINP), di-n-nonyl phthalate, n-nonyl-n-undecyl phthalate, di-n-undecyl phthalate, di-undecyl phthalate (DUP), diisodecyl phthalate (DIDP), di-2-propylheptyl phthalate (DPHP), phthalates with linear $C_6$ to $C_{10}$ radicals, ditridecyl phthalate (DTDP), undecyl dodecyl phthalate, di(2-propylheptyl)phthalate, nonyl undecyl phthalate, Texanol benzyl phthalate, polyester phthalate, diallyl phthalate, n-butylphthalyl n-butylglycosate, dicaprylyl phthalate, butyl cyclohexyl phthalate (BCP), di-cyclohexyl phthalate or butyl octyl phthalate, dioctyl adipate (DOA), di-2-ethylhexyl adipate, diisononyl adipate (DINA), diisooctyl adipate (DIOA), diisodecyl adipate, ditridecyl adipate (DITA), dibutoxyethyl adipate, dibutoxyethoxyadipate, di(n-octyl)adipate, polyester adipates, polyglycol adipates, trioctyl trimellitates, tri-2-ethylhexyl trimellitate (TOTM), triisooctyl trimellitate (TIOTM), triisononyl trimellitate, triisodecyl trimellitate, tri-n-hexyl trimellitate, dioctyl azelate (DOZ), di-2-ethylhexyl glutarate, di-2-ethylhexyl sebacate, dibutyl sebacate, dibutoxyethyl sebacate, triethyl citrate, acetyl triethyl citrate, tri-n-butyl citrate, acetyl tri-n-butyl citrate, acetyl tri-n-hexyl citrate, n-butyl tri-n-hexyl citrate, isodecyl benzoate, diethylene glycol dibenzoate, dipropylene glycol dibenzoate, triethylene glycol dibenzoate, 1,4-cyclohexanedimethanol dibenzoate, 2,2,4-trimethyl-1,3-pentanediol dibenzoate, 2,2-dimethyl-1,3-propanediol dibenzoates, $C_{10}$-$C_{21}$ alkanoic acid phenol esters or alkylsulfonic acid phenol esters, reaction products of acetic acid with hydrogenated castor oil, pentaerythritol tetrabenzoate, glycerol tribenzoate, polypropylene glycol dibenzoate, triaryl phosphates, polymers of adipic acid, phthalates, adipates and/or sebacates with glycol, butyl benzyl phthalate, alkyl benzyl phthalate, $C_7$-$C_9$ butyl phthalates, diethylene glycol dibenzoate, dipropylene glycol dibenzoate, 2-ethylhexyl benzoate, $C_9$ benzoates, $C_{10}$ benzoates, Texanol benzoate, ethylene glycol dibenzoate, propylene glycol dibenzoate, triethylene glycol dibenzoate, diheptyl phthalate (DHP), dihexyl phthalate, dimethyl phthalate, diethyl phthalate, dibutyl phthalate and diisobutyl phthalate. As plasticizers it is also possible to use esters of an aliphatic or aromatic dicarboxylic or tricarboxylic acid with a $C_{10}$ alcohol component comprising 2-propylheptanol or a $C_{10}$ alcohol mixture of 2-propylheptanol and at least one of the $C_{10}$ alcohols 2-propyl-4-methylhexanol, 2-propyl-5-methylhexanol, 2-isopropyl-heptanol, 2-isopropyl-4-methylhexanol, 2-isopropyl-5-methylhexanol and/or 2-propyl-4,4-dimethylpentanol, the aliphatic or aromatic dicarboxylic or tricarboxylic acid being selected from the group consisting of citric acid, phthalic acid, isophthalic acid, terephthalic acid and trimellitic acid.;
and also further substances used in fluid systems.

The present invention further provides, finally, fluid systems which result from the above-described use. More particularly the system in question is an adhesive or sealant, coating material or coating.

In another preferred embodiment, the mixture of α) comprising at least one amine and β) comprising at least one isocyanate, after leaving the mixing means is comminuted in an apparatus. Suitable apparatus for comminuting includes, in particular mills, such as ball mills, extruders, perforated disk mills, toothed colloid mills or a triple-roll mill. In this case the thixotropic agent may be obtained in a form which features very high levels of active compound and which is distinguished in performance terms by very good processing properties. More particularly, the process is suitable for obtaining a product in powder form having a very high thixotropic agent content. The comminuted product may subsequently be introduced, for example, into a fluid system. In this case as well it is possible, as already described, to use the product of the invention both in a discontinuous process and in continuous processes for producing a fluid system.

Further provided for the present invention, as well, are fluid systems which result from the above-described use. Such a system is more particularly an adhesive or sealant, coating material or coating.

All in all, the proposed process provides thixotropic agents on the basis of a urea derivative, for which it is largely possible to do without a carrier material. The process is economical, provides good product quality and can be employed flexibly. In particular, the product obtained can be used for producing fluid systems.

The present invention is described in more detail below with reference to working examples.

EXAMPLES

General Preparation Instructions for the Sealant

⅓ of Desmoseal M 280, plasticizer, Omyacarb 5 GU, and ⅔ of additive Ti (toluenesulfonyl isocyanate) are introduced and are mixed with one another under reduced pressure at a temperature of 25° C., after which the thixotropic agent is introduced. Subsequently ⅔ of Desmoseal M 280 is added. In the final step, Dynasylan GLYMO, ⅓ of additive Ti and Lupranat N 106 DMDEE are added and mixed. The sealant is dispensed into aluminum or plastic cartridges.

|  | Parts by weight | % by weight |
| --- | --- | --- |
| Palatinol 10-P | 160.00 | 20.00 |
| Desmoseal M 280 | 200.00 | 25.00 |
| Omyacarb 5 GU | 305.60 | 38.20 |
| Thixotropic agent | 120.00 | 15.00 |
| Dynasylan GLYMO | 8.00 | 1.00 |
| Additive Ti | 6.00 | 0.75 |
| Lupranat N 106 DMDEE | 0.40 | 0.05 |
| Total | 800.00 | 100.00 |

Desmoseal M 280: polyurethane binder from Bayer MaterialScience AG

Palatinol 10-P: di-2-propylheptyl phthalate from BASF SE

Omyacarb 5 GU: ground chalk from Omya Inc.

Additive Ti: monofunctional isocyanate from OMG Borchers GmbH

Dynasylan GLYMO: 3-glycidyloxypropyltrimethoxysilane from Evonik Degussa GmbH

Lupranat N 106 DMDEE: 2,2'-dimorpholinyldiethyl ether from BASF SE

Example 1

The thixotropic agent is prepared by means of a high-pressure spraying unit from Isotherm AG (metering unit PSM 700; mixing head: RSP 400), with the following components being introduced gravimetrically in a ratio of 1:1 into the mixing head and sprayed directly into the sealant-containing mixing vessel with stirring.

|  | n-Butylamine | Isomer mixture of 4,4'- and 2,4'-diphenylmethane diisocyanate | Palatinol 10-P |
| --- | --- | --- | --- |
| Amine component | 8.12 parts by weight | — | 41.88 parts by weight |
| Isocyanate component | — | 13.88 parts by weight | 36.12 parts by weight |

Palatinol 10-P: di-2-propylheptyl phthalate from BASF SE

The distance between the exit aperture of the mixing head and the sealant in this case is approximately 10 cm. The flow rate is 60 g/s. The two components are discharged with a pressure of 120 bar from the mixing head. The amount of thixotropic agent sprayed in is enough to give the sealant a thixotropic agent content of 15% by weight at the end. Subsequent to the mixing operation, the sealant is dispensed into cartridges.

Example 2

A urea thixotropic agent is prepared by means of a high-pressure spraying unit from Isotherm AG (metering unit PSM 700; mixing head: RSP 400), with the following components being applied by spraying gravimetrically in a ratio of 1:1 to a triple-roll mill.

|  | n-Butylamine | Isomer mixture of 4,4'- and 2,4'- diphenylmethane diisocyanate | Palatinol 10-P |
|---|---|---|---|
| Amine component | 8.12 parts by weight | — | 41.88 parts by weight |
| Isocyanate component | — | 13.88 parts by weight | 36.12 parts by weight |

The flow rate is 40 g/s. The two components are discharged with a pressure of 90 bar from the mixing head. Subsequently, an amount of the prepared thixotropic agent such that the above-described sealant contains 15% by weight of the thixotropic agent at the end is introduced. Subsequently the sealant is dispensed into cartridges.

Example 3 (Comparative)

A urea thixotropic agent is prepared by combining the two components in a planetary mixer by means of a metering pump, in a ratio of 1:1. The planetary drive rotates with a constant speed of 50 rpm, the dissolver disk at 500 rpm and the cross-arm mixer at 150 rpm.

|  | n-Butylamine | Isomer mixture of 4,4'- and 2,4'- diphenylmethane diisocyanate | Palatinol 10-P |
|---|---|---|---|
| Amine component | 8.12 parts by weight | — | 41.88 parts by weight |
| Isocyanate component | — | 13.88 parts by weight | 36.12 parts by weight |

The product cannot be produced by this preparation process. Mixing between the reactants is not ensured, since as soon as the components strike one another they form a solid mass which can no longer be agitated. The yield is <70%.

The invention claimed is:

1. A process for preparing a thixotropic agent based on a urea derivative, wherein the components
   α) comprising at least one amine and
   β) comprising at least one isocyanate,
   are supplied separately to a mixer and are mixed with one another, wherein components α) and β) are introduced with a pressure of at least 40 to 200 bar into the mixer, the reaction mixture being discharged by spraying or squirting from the mixer.

2. The process according to claim 1, wherein this mixer is a spray head.

3. The process according to claim 1, wherein the molar ratio of the amine groups of the amine-comprising component to the isocyanate groups of the isocyanate-comprising component is 5:1 to 1:5.

4. The process according to claim 1, wherein the amine of component α) comprises N-n-alkylamine and/or N-n-alkenylamine and/or secondary N-alkylamine having 1 to 22 carbon atoms and/or polyetheramines.

5. The process according to claim 1, wherein the isocyanate of component β) comprises: hexamethylene 1,6-diisocyanate (HDI); 1-isocyanato-3,3,5-trimethyl-5-isocyanatomethylcyclohexane (IPDI); 2,4- and/or 2,6-tolylene diisocyanate (TDI) and/or 4,4'-, 2,4'- and/or 2,2'-diphenylmethane diisocyanate (MDI); m-xylene diisocyanate (MXDI); m- or p-tetramethylxylene diisocyanate (m-TMXDI, p-TMXDI); polyisocyanate comprising isocyanurates of HDI, NCO content: 23.4% by weight, viscosity 1200 mPa/s at 23° C.; 4,4'-dicyclohexylmethane diisocyanate (H12MDI); naphthalene 1,5-diisocyanate; cyclohexane 1,4-diisocyanate; hydrogenated xylylene diisocyanate (H6XDI); 1-methyl-2,4-diisocyanatocyclohexane; tetramethoxybutane 1,4-diisocyanate; butane 1,4-diisocyanate; 1,6-diisocyanato-2,2,4-trimethylhexane; 1,6-diisocyanato-2,4,4-trimethylhexane; 1-isocyanato-1-methyl-4(3)-isocyanatomethylcyclohexane (IMCI); 1,12-dodecane diisocyanate (C12DI) or mixtures thereof.

6. A process for preparing a thixotropic agent based on a urea derivative, wherein the components
   α) comprising at least one amine and
   β) comprising at least one isocyanate, are supplied separately to a mixer and are mixed with one another, wherein the mixture of
   α) comprising at least one amine and β) comprising at least one isocyanate, after leaving the mixer, is spray-applied, squirt-applied, squirt-introduced or spray-introduced (in)to a composition;
   wherein the process is carried out continuously or discontinuously; and wherein the thixotropic agent is introduced into the composition in an amount of 0.05 to 40% by weight, based on the total mass of the composition.

7. The process according to claim 6, wherein the degree of conversion of α) amine with β) isocyanate on spray application or squirt application prior to contact with the composition is at least 75%, with respect, where appropriate, to the component used in deficit proportion.

8. A composition produced according to a process for preparing a thixotropic agent based on a urea derivative, wherein the components
   α) comprising at least one amine and
   β) comprising at least one isocyanate,
   are supplied separately to a mixer and are mixed with one another,
   wherein the mixture of α) comprising at least one amine and β) comprising at least one isocyanate, being discharged by spraying or squirting from the mixer, is spray-applied, squirt-applied, squirt-introduced or spray-introduced (in)to the composition.

9. A process for preparing a thixotropic agent based on a urea derivative, wherein the components
   α) comprising at least one amine and
   β) comprising at least one isocyanate,
   are supplied separately to a mixer and are mixed with one another, the reaction mixture being discharged by spraying or squirting from the mixer, wherein the mixture of α) comprising at least one amine and β) comprising at least one isocyanate, after leaving the mixer, is comminuted in an apparatus.

10. The process according to claim 9, wherein the comminuted product is introduced into a composition.

11. The process comprising using a composition according to claim 10 as an adhesive or sealant, coating material or coating.

12. The composition of claim 8, wherein said composition comprises an adhesive or sealant, comprising said thixotropic agent and at least one curable binder.

13. The composition of claim 12, wherein said at least one curable binder comprises epoxides, polyurethanes, acrylates, silylated polyurethanes, silylated acrylates, silylated polyureas, silyl-terminated polyethers, and silylated polysulfides.

14. The composition of claim 12, wherein said at least one curable binder comprises polyurethane.

15. The process of claim 11, wherein said composition comprises an adhesive or sealant, comprising said thixotropic agent and at least one curable binder.

16. The process of claim 15, wherein said at least one curable binder comprises epoxides, polyurethanes, acrylates, silylated polyurethanes, silylated acrylates, silylated polyureas, silyl-terminated polyethers, and silylated polysulfides.

17. The process of claim 15, wherein said at least one curable binder comprises polyurethane.

18. The process of claim 9, wherein the amine of component α) comprises N-n-alkylamine and/or N-n-alkenylamine and/or secondary N-alkylamine having 1 to 22 carbon atoms and/or polyetheramines; and/or, wherein the isocyanate of component β) comprises: hexamethylene 1,6-diisocyanate (HDI); 1-isocyanato-3,3,5-trimethyl-5-isocyanatomethylcyclohexane (IPDI); 2,4- and/or 2,6-tolylene diisocyanate (TDI) and/or 4,4'-, 2,4'- and/or 2,2'-diphenylmethane diisocyanate (MDI); m-xylene diisocyanate (MXDI); m- or p-tetramethylxylene diisocyanate (m-TMXDI, p-TMXDI); polyisocyanate comprising isocyanurates of HDI, NCO content: 23.4% by weight, viscosity 1200 mPa/s at 23° C.; 4,4'-dicyclohexylmethane diisocyanate (H12MDI); naphthalene 1,5-diisocyanate; cyclohexane 1,4-diisocyanate; hydrogenated xylylene diisocyanate (H6XDI); 1-methyl-2,4-diisocyanatocyclohexane; tetramethoxybutane 1,4-diisocyanate; butane 1,4-diisocyanate; 1,6-diisocyanato-2,2,4-trimethylhexane; 1,6-diisocyanato-2,4,4-trimethylhexane; 1-isocyanato-1-methyl-4(3)-isocyanatomethylcyclohexane (IMCI); 1,12-dodecane diisocyanate (C12DI) or mixtures thereof.

19. The composition of claim 8, wherein the amine of component α) comprises N-n-alkylamine and/or N-n-alkenylamine and/or secondary N-alkylamine having 1 to 22 carbon atoms and/or polyetheramines; and/or, wherein the isocyanate of component β) comprises: hexamethylene 1,6-diisocyanate (HDI); 1-isocyanato-3,3,5-trimethyl-5-isocyanatomethylcyclohexane (IPDI); 2,4- and/or 2,6-tolylene diisocyanate (TDI) and/or 4,4'-, 2,4'- and/or 2,2'-diphenylmethane diisocyanate (MDI); m-xylene diisocyanate (MXDI); m- or p-tetramethylxylene diisocyanate (m-TMXDI, p-TMXDI); polyisocyanate comprising isocyanurates of HDI, NCO content: 23.4% by weight, viscosity 1200 mPa/s at 23° C.; 4,4'-dicyclohexylmethane diisocyanate (H12MDI); naphthalene 1,5-diisocyanate; cyclohexane 1,4-diisocyanate; hydrogenated xylylene diisocyanate (H6XDI); 1-methyl-2,4-diisocyanatocyclohexane; tetramethoxybutane 1,4-diisocyanate; butane 1,4-diisocyanate; 1,6-diisocyanato-2,2,4-trimethylhexane; 1,6-diisocyanato-2,4,4-trimethylhexane; 1-isocyanato-1-methyl-4(3)-isocyanatomethylcyclohexane (IMCI); 1,12-dodecane diisocyanate (C12DI) or mixtures thereof.

20. The process of claim 6, wherein the amine of component α) comprises N-n-alkylamine and/or N-n-alkenylamine and/or secondary N-alkylamine having 1 to 22 carbon atoms and/or polyetheramines; and/or, wherein the isocyanate of component β) comprises: hexamethylene 1,6-diisocyanate (HDI); 1-isocyanato-3,3,5-trimethyl-5-isocyanatomethylcyclohexane (IPDI); 2,4- and/or 2,6-tolylene diisocyanate (TDI) and/or 4,4'-, 2,4'- and/or 2,2'-diphenylmethane diisocyanate (MDI); m-xylene diisocyanate (MXDI); m- or p-tetramethylxylene diisocyanate (m-TMXDI, p-TMXDI); polyisocyanate comprising isocyanurates of HDI, NCO content: 23.4% by weight, viscosity 1200 mPa/s at 23° C.; 4,4'-dicyclohexylmethane diisocyanate (H12MDI); naphthalene 1,5-diisocyanate; cyclohexane 1,4-diisocyanate; hydrogenated xylylene diisocyanate (H6XDI); 1-methyl-2,4-diisocyanatocyclohexane; tetramethoxybutane 1,4-diisocyanate; butane 1,4-diisocyanate; 1,6-diisocyanato-2,2,4-trimethylhexane; 1,6-diisocyanato-2,4,4-trimethylhexane; 1-isocyanato-l-methyl-4(3)-isocyanatomethylcyclohexane (IMCI); 1,12-dodecane diisocyanate (C12DI) or mixtures thereof.

* * * * *